United States Patent
Dahlbäck et al.

(10) Patent No.: US 7,292,671 B1
(45) Date of Patent: Nov. 6, 2007

(54) ZIRCONIUM BASED ALLOY AND COMPONENT IN A NUCLEAR ENERGY PLANT

(75) Inventors: Mats Dahlbäck, Västerås (SE);
Magnus Limbäck, Västerås (SE);
Gunnar Wikmark, Uppsala (SE)

(73) Assignee: Westinghouse Electric Sweden AB (SE)

( * ) Notice: Subject to any disclaimer, the term of this patent is extended or adjusted under 35 U.S.C. 154(b) by 0 days.

(21) Appl. No.: 09/857,606

(22) PCT Filed: Dec. 8, 1999

(86) PCT No.: PCT/SE99/02300

§ 371 (c)(1),
(2), (4) Date: Aug. 2, 2001

(87) PCT Pub. No.: WO00/36170

PCT Pub. Date: Jun. 22, 2000

(30) Foreign Application Priority Data

Dec. 11, 1998 (SE) .................................... 9804292

(51) Int. Cl.
*C22C 16/00* (2006.01)
*G21C 3/07* (2006.01)

(52) U.S. Cl. ...................... 376/412; 376/416; 148/421; 420/422

(58) Field of Classification Search ................ 420/422; 148/421; 376/409, 261, 434, 412
See application file for complete search history.

(56) References Cited

U.S. PATENT DOCUMENTS

| | | | | |
|---|---|---|---|---|
| 4,610,842 | A | | 9/1986 | Vannesjö .................... 376/416 |
| 4,778,648 | A | * | 10/1988 | Ferrari ....................... 376/457 |
| 5,023,048 | A | | 6/1991 | Mardon et al. |
| 5,211,774 | A | * | 5/1993 | Garde et al. ................ 148/421 |
| 5,254,308 | A | * | 10/1993 | Garde et al. ................ 148/672 |
| 5,373,541 | A | * | 12/1994 | Mardon et al. ............. 376/457 |
| 5,560,790 | A | | 10/1996 | Nikulina et al. |
| 5,790,623 | A | * | 8/1998 | Van Swam .................. 376/409 |
| 5,912,935 | A | | 6/1999 | Isobe et al. |
| 5,940,464 | A | * | 8/1999 | Mardon et al. ............. 148/672 |
| 5,985,211 | A | * | 11/1999 | Jeong et al. ................ 148/421 |
| 6,125,161 | A | * | 9/2000 | Isobe et al. ................. 148/672 |

FOREIGN PATENT DOCUMENTS

| | | |
|---|---|---|
| DE | 3310054 A1 | 10/1983 |
| EP | 0 121 204 | 10/1984 |
| EP | 0 380 381 | 8/1990 |
| FR | 2 769 637 | 4/1999 |
| JP | 62-182258 | 8/1987 |
| JP | 02159336 * | 6/1990 |
| JP | 08067954 * | 3/1996 |
| RU | 2032759 C1 | 4/1995 |
| WO | 94/14990 | 7/1994 |
| WO | 97/05628 | 2/1997 |

OTHER PUBLICATIONS

T. Isobe et al., Development of Highly Corrosion Resistant Zirconium-Based Alloys, Zirconium in the Nuclear Industry: Ninth International Symposium, 1991, ASTM Publication STP 1132, pp. 346-367, no month available.
"Performance of standard and advanced fuel rod cladding for high burnup applications in PWRs," Pati et al., pp. 413-420, in the Proceedings of the 1997 International Topical Meeting on LWR Fuel Perfomance, Portland, Oregon, Mar. 2-6, 1997.
H.S. Rosenbaum et al., "Large Scale Demonstration of Barrier Fuel," "Improvements in Water Reactor Fuel Technology and Utilization, Proceedings of a Symposium, Stockholm, Sep. 15-19, 1986," 1987, pp. 117-134, International Atomic Energy Agency, Vienna, no month available.
M. Dahlbäck et al., "The Effect of Liner Component Iron Content on Cladding Corrosion, Hydriding, and PCI Resistance," "Zirconium in the Nuclear Industry: Fourteenth Symposium," pp. 873-875, Journal of ASTM International, Oct. 2005, vol. 2, No. 9.

* cited by examiner

*Primary Examiner*—Harry D Wilkins, III
(74) *Attorney, Agent, or Firm*—Bingham McCutchen LLP

(57) ABSTRACT

A zirconium-based alloy, suitable for use in a corrosive environment, where it is subjected to increased radiation and comprises 0.5-1.6 percentage by weight Nb and 0.3-0.6 percentage by weight Fe. The alloy is characterised in that it comprises 0.5-0.85 percentage by weight Sn.

9 Claims, No Drawings

ZIRCONIUM BASED ALLOY AND COMPONENT IN A NUCLEAR ENERGY PLANT

BACKGROUND OF THE INVENTION AND PRIOR ART

The present invention concerns a zirconium-based alloy, suitable for use in a corrosive environment where it is subjected to increased radiation and comprising 0.5-1.6 percentage by weight Nb and 0.3-0.6 percentage by weight Fe. The invention also concerns a component in a nuclear energy plant, which comprises an alloy of the mentioned kind.

According to the prior art it is known to provide, in a nuclear energy plant, a component which comprises a zirconium-based alloy of the above-mentioned kind. Such an alloy has the advantage of fulfilling the requirements which are demanded on mechanical as well as corrosion properties of a material which in a corrosive environment is subjected to an increased radiation, in particular neutron radiation of the fast neutron kind.

Thanks to its relatively high Fe-content it is possible through a suitable heat treatment, comprising annealing and quenching, to obtain secondary phase particles consisting of Zr, Fe and Nb in a matrix of a-phase of the zirconium-based alloy. By a suitable choice of the heat treatment variables time and temperature it is furthermore, with given contents of the included alloying materials Nb and Fe, possible to control the size of and the distribution of the secondary phase particles. The secondary phase particles may have a positive effect on the corrosion resistance of the alloy. It is therefore important to optimize the distribution of and the size of the existing secondary phase particles. It is thereby highly important to find a suitable composition of the alloying elements included in the alloy.

The document U.S. Pat. No. 5,560,790 describes a zirconium-based alloy which comprises 0.5-1.5 percentage by weight Nb, 0.9-1.5 percentage by weight Sn and 0.3-0.6 percentage by weight Fe. Furthermore, this alloy comprises 0.005-0.2 percentage by weight Cr, 0.005-0.04 percentage by weight C, 0.05-0.15 percentage by weight O, 0.005-0.15 percentage by weight Si and the rest Zr. Thereby a microstructure is achieved in the material which includes particles of the kind $Zr(Nb,Fe)_2$, $Zr(Nb,Cr,Fe)$ and $(Zr,Nb)_3Fe$. These secondary phase particles give the material good corrosion properties and good mechanical properties. Thanks to the high Fe-content, precipations of β-Nb-phase are avoided, which would have a negative influence on the resistance of the material against local corrosion attacks.

Sn is said to have a high solubility in the α-phase and will therefore, when it is present to the given amount, be dissolved in the α-phase and contribute to improved corrosion properties and mechanical properties of the same. It is pointed out that a too low content of Sn (below 0.9 percentage by weight) in the material influences the tensile strength of the material both in the long and in the short term. Furthermore, such a low Sn-content suppresses to a smaller extent a negative effect of a possible nitrogen incorporation on the corrosion resistance of the material. A Sn content above 1.5 percentage by weight influences the susceptibility of the material to working and in particular to cold working.

It is mentioned that Si and C contribute to a reduction of the size of the particles and to bring about a structural homogeneity in the material.

Oxygen is said to contribute to a finer structure of the material and is also used as a means for reinforcing the material through the solid solution, a so-called "solid solution strengthener".

Nb is said to contribute to the strength properties of Zr and increases the corrosion resistance of the alloy by forming secondary phase particles together with Zr and Fe.

It is furthermore pointed out that with a Nb-content below 0.5 percentage by weight of the material, a Fe-content below 0.3 percentage by weight and a Cr-content below 0.005 percentage by weight, the total portion of secondary phase particles of the above-mentioned kind in the α-zirconium matrix of the end product is considerably lower than 60 percentage by volume of the total amount of iron-containing secondary phase particles, which results in that the corrosion resistance of the material is negatively influenced. With a Nb-content above 1.5 percentage by weight, a large number of large particles of β-Nb phase are formed in the material, which also reduces the corrosion resistance of the same.

It is also mentioned that a Cr-content above 0.2 percentage by weight may result in the formation of binary intermetallic compounds of Zr—Cr, which has an opposite i.e. negative, influence on the workability and the tensile strength of the material.

SUMMARY OF THE INVENTION

A purpose with the present invention is to provide a zirconium-based alloy with such a composition that the distribution of and the size of secondary phase particles in the alloy, the kind of secondary phase particles and the content of different alloying elements in the α-phase of the alloy are such that the alloy is optimized with respect to physical and mechanical properties as well as corrosion properties. In particular, these properties should be optimized with respect to an application where the alloy is subjected to an increased radiation of the fast-neutron kind in a corrosive environment, such as in the reactor core of a nuclear energy plant. In particular it is aimed at improved corrosion properties of the alloy with respect to the corrosion properties of the above-mentioned alloys according to the prior art.

This purpose is achieved by means of an alloy of the kind initially defined, which alloy is characterised in that it comprises 0.5-0.85 percentage by weight Sn. This choice of Sn-content stands in opposition to that which, according to the prior art, is a preferred interval for the Sn-content. The applicant has however found that improved corrosion properties, in particular in the environment which is the case in the area of the reactor core of a nuclear energy plant, may be achieved in the zirconium-based alloy by a careful choice of the Sn-content within the defined interval.

According to a preferred embodiment of the alloy, the content of Sn in the alloy is larger than or equal to 0.65 percentage by weight. A preferred interval for the Sn-content should thus be 0.65-0.85 percentage by weight with the purpose of achieving as good corrosion properties in the alloy as possible under the otherwise given conditions.

According to a further preferred embodiment, the alloy comprises up to 0.2 percentage by weight Ni. Thereby secondary phase particles containing Zr, Ni and Fe may be obtained in the alloy. Such secondary phase particles contribute to improved corrosion properties of the alloy and have good stability under neutron radiation.

According to a further preferred embodiment, the alloy comprises up to 0.6 percentage by weight Cr, which is more than the maximum 0.2 percentage by weight which has previously been recommended with respect to the formation of binary intermetallic compounds of Cr and Zr. With the remaining composition which the alloy according to the invention has, a content of up to 0.6 percentage by weight Cr may however be permitted in order to improve the corrosion properties of the alloy, without the alloy thereby obtaining considerably worse mechanical properties, such as a deteriorated tensile strength. Unlike the prior art, the present invention thus suggests a zirconium-based alloy with a Cr-content above 0.2 percentage by weight, up to 0.6 percentage by weight.

According to a further preferred embodiment, the total content of Nb and Sn is larger than or equal to 1.15 percentage by weight. Such a total content of Nb and Sn contributes to improved mechanical properties of the alloy.

Which requirements on mechanical properties and corrosion properties that finally are demanded on the alloy depend on in which application the alloy finally is to be used. According to a preferred embodiment of the invention, the alloy constitutes at least a part of a component in a nuclear energy plant. The component is preferably arranged in the area of the reactor core and constitutes, according to a further preferred embodiment, a part of a fuel assembly. In such an application high requirements will at least be demanded on the corrosion properties of the alloy. Depending on to which extent the component has a supporting function, specific requirements will also be demanded on the mechanical properties of the alloy. An alloy of the kind which is suggested by the invention is in particular suitable to constitute at least a part of a cladding tube, a spacer or a box.

A further purpose of the invention is to provide a component in a nuclear energy plant, which component in particular has satisfactory corrosion properties with respect to the specific conditions which may be assumed to be the case in the nuclear energy plant, in particular in the area of the core of the same, where the component is subjected to an increased radiation of the fast neutron kind, in a corrosive environment, e.g. surrounded by a corrosive medium, such as water.

This purpose is achieved by means of a component of the initially defined kind, which comprises an alloy according to the invention.

According to a preferred embodiment, the component constitutes a part of a fuel assembly, i.e. it is arranged in the area of the reactor core. Thereby specific requirements are demanded on its corrosion properties in the environment of increased radiation and corrosive media which it is subjected to. The choice of a zirconium-base alloy with a suitable composition is consequently highly important.

According to a further preferred embodiment, the component defines a cladding tube. Thereby also specific mechanical properties of the component are required, which are fulfilled by the alloy according to the invention.

According to a further preferred embodiment, at least a part of the inner circumference of the cladding tube comprises a layer of a material which is more ductile than the alloy according to the invention. The cladding tube is thereby made less sensitive to the direct contact with the fuel within these. The risk for crack formation of the cladding tube in areas where it comes into direct contact with and possibly is subjected to wear caused by the fuel is reduced, under the condition that the layer of the more ductile material is arranged in these areas, which preferably is the case. Said layer comprises here a zirconium-based alloy with a total content of alloying materials which does not exceed 0.5 percentage by weight.

Further advantages with and features of the alloy according to the invention and the component, respectively, will be clear from the following, detailed description.

DETAILED DESCRIPTION OF A PREFERRED EMBODIMENT

A component arranged in a nuclear energy plant, more precisely in the area of the reactor core, is subjected to increased radiation of the fast neutron kind in a corrosive environment. The reactor may be a pressure water or a boiling water reactor. The component constitutes a part of the fuel assembly. In this example the component is a cladding tube arranged to contain the reactor fuel.

The component comprises a zirconium-based alloy which has the following composition:

0.5-0.85 percentage by weight Sn, 0.3-0.6 percentage by weight Fe, 0-0.6 percentage by weight Cr, 0-0.2 percentage by weight Ni, 0.65-1.6 percentage by weight Nb and the rest zirconium.

The content of Ni is preferably within the interval 0.05-0.2 percentage by weight.

According to an alternative embodiment the alloy comprises 0.65-0.85 percentage by weight Sn and 0.5-1.6 percentage by weight Nb, with the remaining elements within the previously mentioned intervals.

The cladding tube may be formed from a solid bar, in the centre of which a hole has been drilled. Furthermore, the component has, in addition to prior annealings in connection with the working of the same, finally been annealed in the β-phase area of the alloy and then been quenched by a β-quenching in the α-phase area of the alloy.

By the annealing in the β-phase area, course structures and other effects of the prior heat treatment history are removed from the alloy. Furthermore, the orientated texture which has been obtained during prior working of the work piece of the tube is removed, whereby different tendencies to growth in different directions of the component, when it is exposed to neutron radiation in the core, are avoided.

The cooling to the α-phase area is so fast that an entity of short α-phase laminae is formed in the prior α-phase grains. Short α-laminae improve the mechanical strength of the alloy.

Furthermore at the quenching from the β-phase area to the α-phase area secondary phase particles of intermetallic compounds, such as $Zr(Nb,Fe)_2$, $Zr(Fe,Cr,Nb)$ and $(Zr,Nb)_3Fe$, are precipitated, which favours good anticorrosive and mechanical properties of the finished alloy and thereby of the component. The quenching speed should thereby be adjusted such that an optimal secondary phase particle distribution and secondary phase average particle size are obtained. The alloy is preferably cooled with a cooling speed below 100° C./second, preferably below 50° C./second and most preferred in order of magnitude 5-20° C./second.

When the component, such as here, is a cladding tube, preferably a layer with a lower total content of alloying elements than the remaining alloy is applied on the inner circumference of the cladding tube. The total content of alloying materials in this layer is preferably below 0.5 percentage by weight, wherein the remaining part constitutes Zr. This layer makes the cladding tube more resistant to mechanical influence from the reactor fuel which is arranged in the tube and which physically may rest against and cause tensions in the walls of the cladding tube.

Preferably the alloy according to the invention comprises no essential amount of other materials than those which have been mentioned above. It should however be noted that small amounts of impurities may exist in the alloy. Typical impurities which may exist in zirconium-based alloys are specified in the table below. Furthermore, small amounts of Si and O may exist in the alloy. Typical contents of these materials are also given below:

TABLE

| Element | Al | B | C | Ca | Cd | Cl | Co | Cu | H | Hf |
|---|---|---|---|---|---|---|---|---|---|---|
| Max. ppm | 75 | 0.5 | 270 | 30 | 0.5 | 20 | 20 | 50 | 25 | 100 |
| Element | Mg | Mn | Mo | N | Na | Pb | Si | Ti | U | |
| Max. ppm | 20 | 50 | 50 | 80 | 20 | 130 | 120 | 50 | 3.5 | |

Si and O may exist in contents where Si is 50-120 ppm and O is 500-1600 ppm.

It should be realised that a number of alternative embodiments of the alloy and the component according to the invention will be obvious to a person skilled in the art but still be within the scope of the invention, such as it is defined in the annexed claims.

The invention claimed is:

1. A cladding tube for nuclear fuel, a majority component of the cladding tube being made of a zirconium-based alloy suitable for use in a corrosive environment where it is subjected to increased radiation, the alloy having a quality and impurity level, including, optionally, 500-1600 ppm O and, optionally, 50-120 ppm Si, suitable for use in nuclear reactors, the alloy consisting essentially of:
    0.65-1.6 percent by weight Nb;
    0.3-0.6 percent by weight Fe;
    0.65-0.85 percent by weight Sn; and
    the balance being Zr.

2. The cladding tube according to claim 1, wherein at least a part of an inner circumference of the cladding tube is provided with a layer of a material that is more ductile than the alloy.

3. The cladding tube according to claim 2, wherein the layer comprises a zirconium-based alloy having a total content of alloying elements that does not exceed 0.5 percent by weight.

4. A cladding tube for nuclear fuel, a majority component of the cladding tube being made of a zirconium-based alloy suitable for use in a corrosive environment where it is subjected to increased radiation, the alloy having a quality and impurity level, including 500-1600 ppm O and 50-120 ppm Si, suitable for use in nuclear reactors, the alloy consisting essentially of:
    0.65-1.6 percent by weight Nb;
    0.3-0.6 percent by weight Fe;
    0.65-0.85 percent by weight Sn; and
    the balance being Zr.

5. The cladding tube according to claim 4, wherein at least a part of an inner circumference of the cladding tube is provided with a layer of a material that is more ductile than the alloy.

6. The cladding tube according to claim 5, wherein the layer comprises a zirconium-based alloy having a total content of alloying elements that does not exceed 0.5 percent by weight.

7. A cladding tube for nuclear fuel, a majority component of the cladding tube being made of a zirconium-based alloy suitable for use in a corrosive environment where it is subjected to increased radiation, the alloy having a quality and impurity level suitable for use in nuclear reactors, the alloy consisting essentially of:
    0.65-1.6 percent by weight Nb;
    0.3-0.6 percent by weight Fe;
    0.65-0.85 percent by weight Sn; and
    the balance being Zr.

8. The cladding tube according to claim 7, wherein at least a part of an inner circumference of the cladding tube is provided with a layer of a material that is more ductile than the alloy.

9. The cladding tube according to claim 8, wherein the layer comprises a zirconium-based alloy having a total content of alloying elements that does not exceed 0.5 percent by weight.

* * * * *